United States Patent
Schulte et al.

(12) 
(10) Patent No.: US 6,297,342 B1
(45) Date of Patent: Oct. 2, 2001

(54) METHOD AND MIXING HEAD FOR PRODUCING A REACTION MIXTURE FROM AN ISOCYANATE AND A HIGHER-VISCOUS POLYOL FORMULATION

(75) Inventors: Klaus Schulte, Bergisch Gladbach; Kurt Krippl, Monheim; Wolfgang Friederichs, Köln; Uwe Künzel; Hans-Ulrich Weber, both of Leverkusen, all of (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 09/367,392

(22) PCT Filed: Feb. 4, 1998

(86) PCT No.: PCT/EP98/00587

§ 371 Date: Aug. 13, 1999

§ 102(e) Date: Aug. 13, 1999

(87) PCT Pub. No.: WO98/35804

PCT Pub. Date: Aug. 20, 1998

(30) Foreign Application Priority Data

Feb. 17, 1997 (DE) .............................. 197 06 030
Sep. 30, 1997 (DE) .............................. 197 43 187

(51) Int. Cl.[7] .................................................. C08G 18/08
(52) U.S. Cl. ........................... 528/44; 521/170; 521/917; 264/51; 264/328.8; 425/817; 422/131
(58) Field of Search ................... 521/917, 170; 528/44; 264/51, 328.8; 425/817; 422/131

(56) References Cited

U.S. PATENT DOCUMENTS

| 4,307,062 | 12/1981 | Wingard | 422/133 |
|---|---|---|---|
| 4,308,226 | 12/1981 | Wingard | 264/45.3 |
| 4,426,348 | 1/1984 | Salisbury | 264/328.6 |
| 4,608,233 | 8/1986 | Fiorentini | 422/133 |
| 5,270,013 | 12/1993 | Decker | 422/133 |
| 5,277,567 | 1/1994 | Bauer et al. | 425/130 |
| 5,360,885 | 11/1994 | Orthmann et al. | 528/49 |
| 5,445,781 | 8/1995 | Addeo et al. | 264/328.6 |
| 5,540,497 | 7/1996 | Addeo et al. | 366/159.1 |

FOREIGN PATENT DOCUMENTS 1401752   7/1975  (GB) .
2275439   8/1994  (GB) .

OTHER PUBLICATIONS

Patent Abstract of Japan, vol. 04, No. 187, Dec. 23, 1980—JP 55–133938 (ASAHI Glass Co. Ltd.

Kunststoff–Handbuch, Band 7: Polyurethane: Carl Hanser Verlag München Wien 1983, p. 175 Das Mischermodell.

Kunststoff–Handbuch, Band 7: Polyurethane, Carl Hanser Verlag München Wien 1983, p. 125 Prinzipieller Aufbau von Maschinen und Anlagen.

*Primary Examiner*—Rachel Gorr
(74) *Attorney, Agent, or Firm*—Joseph C. Gil; Noland J. Cheung; Carolyn M. Sloane

(57) ABSTRACT

The present invention is directed to an agitator-free mixing head and a method for agitator-free production of a reaction mixture from an isocyanate and a higher-viscous polyol formulation, wherein both constituents are fed to a mixing zone and mixed with each other therein, whereby a polyol formulation with a viscosity of at least 3000 mPa.s is fed at low pressure into the mixing zone and at least two flows of low-viscosity constituents (isocyanate and optionally low-viscous polyol) are injected into the flow of high-viscous polyol formulation at high pressure.

5 Claims, 4 Drawing Sheets

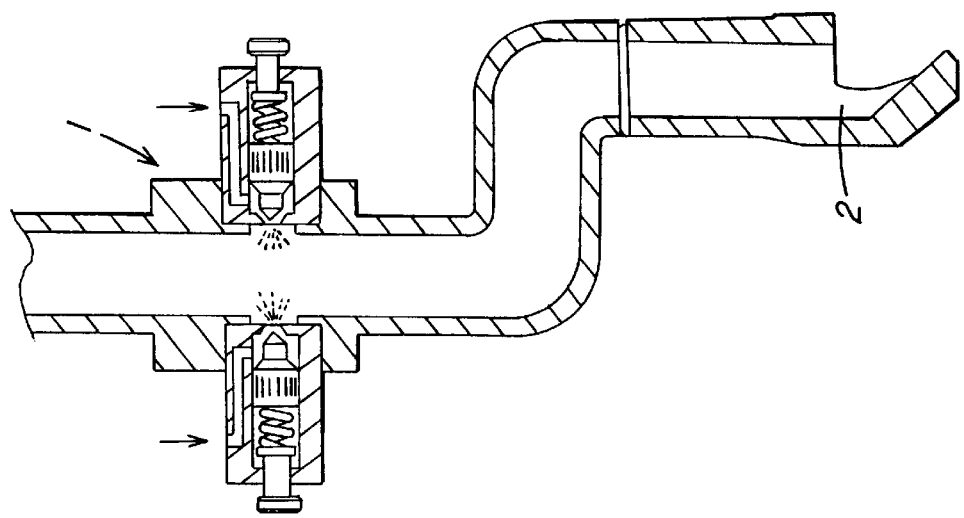
FIG. 2
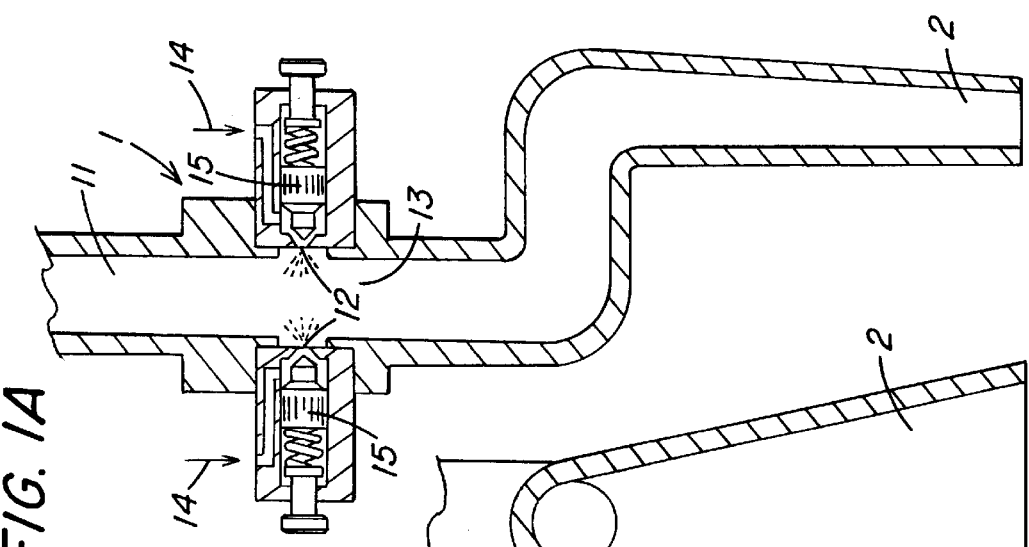
FIG. 1A
FIG. 1B

FIG. 3B A-A

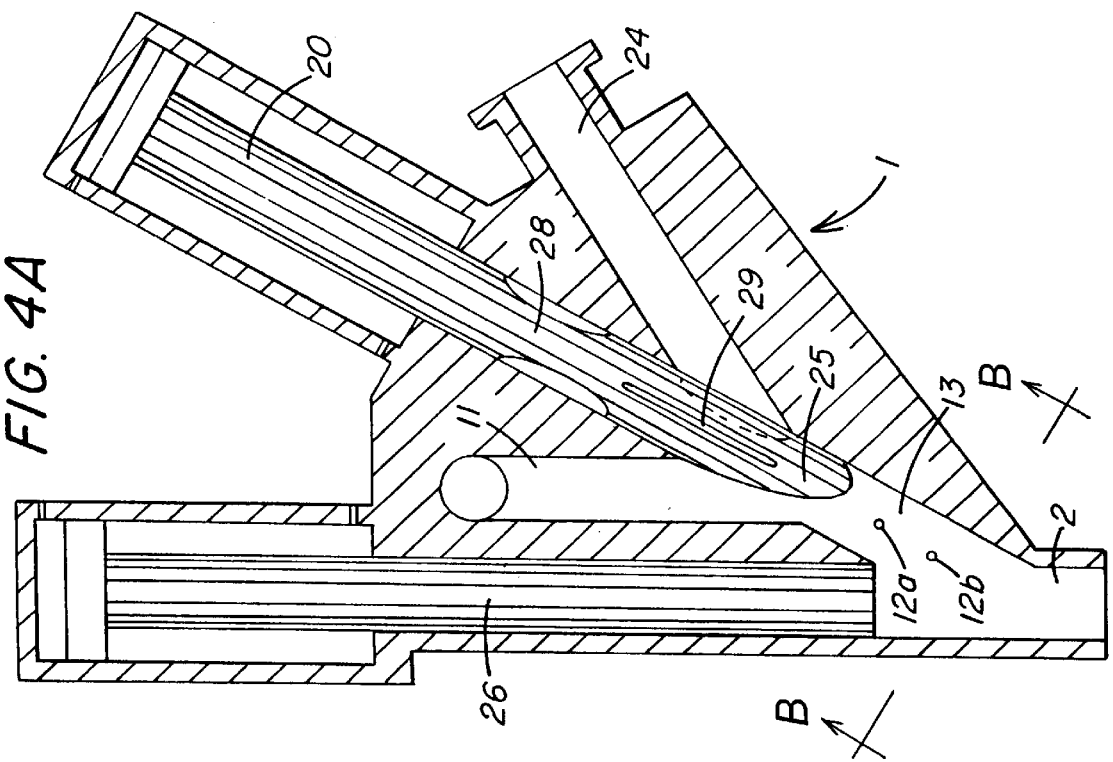
FIG. 4A
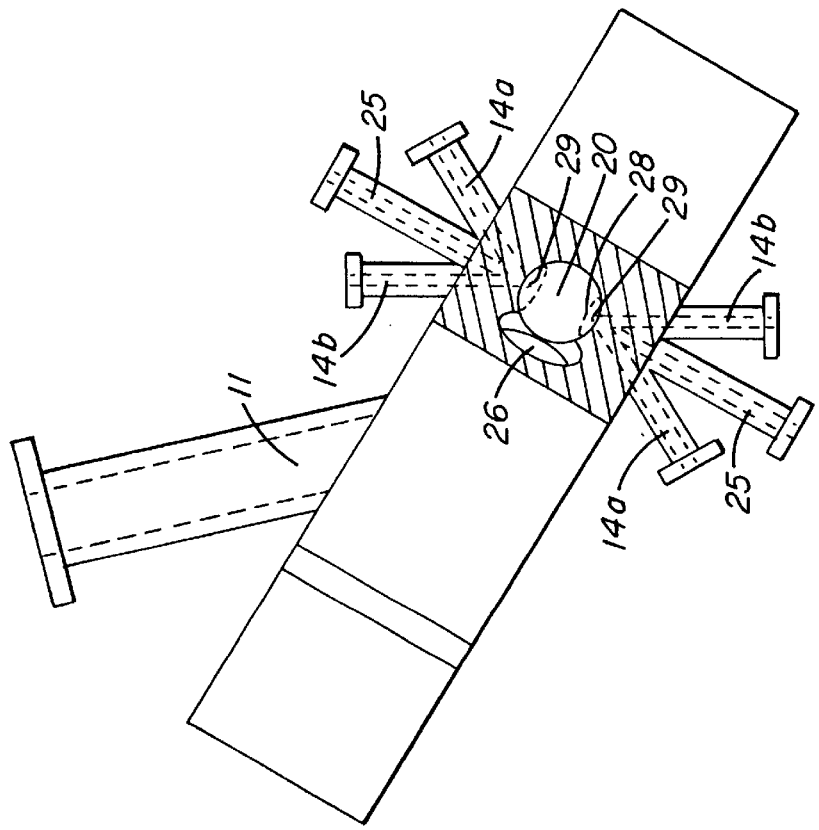
FIG. 4B B-B

METHOD AND MIXING HEAD FOR PRODUCING A REACTION MIXTURE FROM AN ISOCYANATE AND A HIGHER-VISCOUS POLYOL FORMULATION

FIELD OF THE INVENTION

The invention relates to a process for the production, without a stirring apparatus, of a polyurethane-forming reaction mixture from an isocyanate and a polyol formulation, wherein these two components are fed to a mixing zone and are mixed with one another therein, and wherein at least one of the components has a viscosity greater than 3000 mPa.s, preferably greater than 5000 mPa.s.

BACKGROUND OF THE INVENTION

New fields of application require the processing of polyol formulations of higher viscosity. The use of components of higher viscosity offers many advantages. In general the viscosity of polyether polyols, and in particular polyester polyols, increases distinctly with increasing functionality. In order to achieve high degrees of cross-linking, and thus a better mechanical property level, the use of relatively larger quantities and constituents of polyol components of high functionality is desirable.

As high-viscosity component, the isocyanate component is also used in the form of a prepolymer.

Satisfactory mixing in a self-cleaning mixing chamber comprising no stirring apparatus still presents difficulties to the extent to which the viscosity of such components increases. Page 175, last paragraph of the "Kunststoff-Handbuch", Vol. 7, "Polyurethanes" (published by Carl Hanser Verlag, Munich 1993), states: "Whereas the miscibility limit was previously reached at 1500 mPa.s, it is currently possible to handle viscosities exceeding 2000 mPa.s in accordance with the injection method". In reality, however, it has not yet been possible to process reaction components with viscosities above 3000 mPa.s in accordance with the counterflow high-pressure injection method. The resultant foam contains striations and the physical values fall rapidly. It has therefore been necessary to use mixing heads comprising stirring apparatus.

It was also known ("Kunststoff-Handbuch, p. 125) to reduce the viscosity at an elevated processing temperature to 2000 to 3000 mPa.s. However, the increased component temperature causes the reactivity of the systems to increase such that the foaming process can no longer be controlled.

Where the following observations relate to the polyol component as high-viscosity component, this is by way of example. The observations apply correspondingly when an isocyanate component is used as high-viscosity component.

SUMMARY OF THE INVENTION

The object of the present invention is to provide a process and a mixing head with which it is possible, without using a stirring apparatus, to produce a reaction mixture of the type referred to in the introduction which reacts to form a high quality product.

This object is achieved in that a polyol formulation having a viscosity of at least 3000 mPa.s is fed into the mixing zone at low pressure and in that at least two streams of low-viscosity components (isocyanate and optionally low-viscosity polyol) are injected at high pressure into the stream of high-viscosity polyol formulation.

Surprisingly, this results in a good mixing of components of higher viscosity. The invention makes use of the fact that, as a result of the splitting of the higher-viscosity component into two or more sub-streams, although a shift occurs in its energy, the energy is increased overall.

BRIEF DESCRIPTION OF THE DRAWINGS

FIGS. 1a and 1b illustrate a mixing head according to the invention with an outlet having the form of a slot die.

FIG. 2 illustrates a mixing head according to the invention with an outlet in the form of a spoon- or fan nozzle.

FIGS. 3a and 3b illustrate a mixing head according to the invention for batchwise operation.

FIGS. 4a, 4b and 4c illustrate an alternative embodiment of a mixing head according to the invention for batchwise operation.

DETAILED DESCRIPTION OF THE INVENTION

Figure 3A:
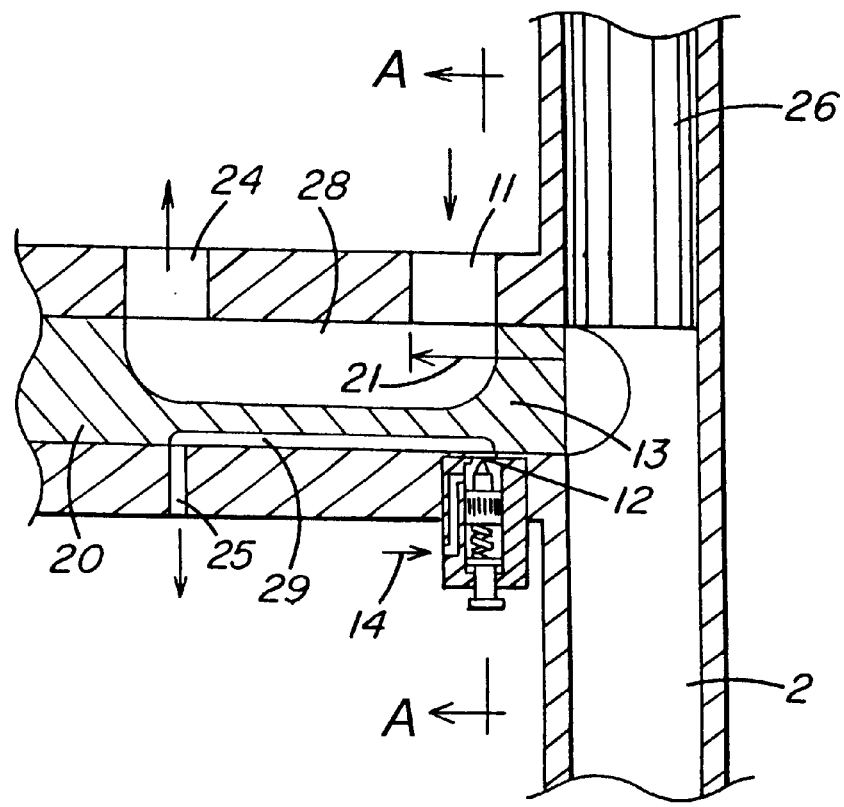
Figure 3A:
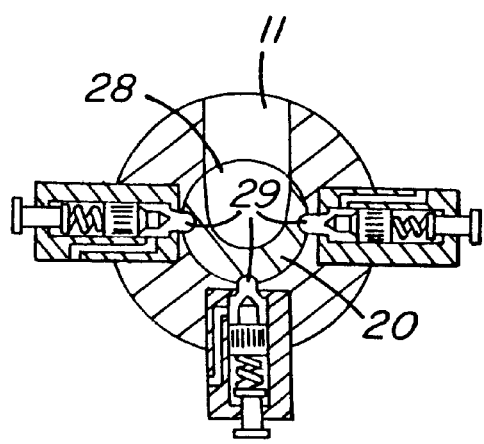

Preferably the cross-sectional area of the stream of the polyol formulation is 10 to 100 times greater than the sum of the cross-sectional areas of the isocyanate streams.

Optionally in cooperation with preferred processing pressures of 50 to 300 bar for isocyanate and less than 20 bar for the polyol formulation, good results are achieved. A pressure of between 70 and 250 bar is preferred and a pressure of between 100 and 200 bar is particularly preferred.

Preferably, the sub-streams of the isocyanate component are injected in a cross-flow.

Here it should be noted that relatively good results are still attainable in the case of not too great a deviation from the cross-flow input.

It is also advantageous for the injection jet not to be directed towards the central axis of the mixing zone since an at least approximately tangential input direction provides for a good degree of mixing as a result of additional turbulence. Normally the input locations will be uniformly distributed over the periphery of the mixing zone and optionally only the low-viscosity component will be supplied at the end side.

In the case of the classical counterflow injection principle with component viscosities of <2000 mPa.s, the following energy distribution is used:

$$(m_{Poly} \times p_{Poly}) + (m_{Iso} \times P_{Iso}) = E$$

With an output of 4 kg/min polyol (viscosity 4000 mPa.s) and 6 kg/min isocyanate (viscosity 50 mPa.s), thus a total output of 10 kg/min at injection pressures of 100 bar, the following energy distribution occurs:

$$(4 \times 100) + (6 \times 100)$$

energy of polyol 400+energy of isocyanate 600=1000

Conversely, in the new process the polyol is supplied at 10 bar and the isocyanate is injected in a cross-flow at 180 bar in two sub-streams oppositely directed to one another:

$$(m_{Poly} \times p_{Poly}) + [(m_{ISO}/2 \times p_{Iso}) + (m_{Iso}/2 \times p_{Iso})] = E$$

$$4 \times 10 + (6/2 \times 180) + (6/2 \times 180)$$

Energy of polyol 40 +energy of isocyanate 1080 =1120

In accordance with an alternative embodiment of the new process, all the streams are introduced into the mixing zone in the same plane.

It is also possible to supply only the higher-viscosity constituent of the polyol formulation at low pressure and, separately therefrom, to inject low-viscosity constituents, as well as the isocyanate, at high pressure into the stream of the high-viscosity constituent.

The following example can be considered here: 4 kg/min polyol is processed, of which ⅔ is of high viscosity and ⅓ is of low viscosity. The high-viscosity constituent is input in perpendicular manner into the mixing zone at a pressure of 10 bar. The low-viscosity constituent and 6 kg/min isocyanate are injected transversely in a total of three sub-streams, offset by 120°, at 150 bar. The associated energy calculation, in which "poly H" is high-viscosity polyol and "poly N" is low-viscosity polyol, is as follows:

$$[(\tfrac{1}{3}m_{PolyH} \times p_{Poly}) + (\tfrac{2}{3}m_{PolyN} \times p_{Poly})] + [(m_{Iso}/2 \times p_{Iso}) + (m_{Iso}/2 \times p_{Iso})] = E$$

(1.33×10)+(2.66×150)+(6/2×150)+(6/2×150)

Energy of polyol 413 + energy of isocyanate 900=1313

When the polyol formulation is split into high-viscosity and low-viscosity constituents, the high-viscosity constituent can also be introduced in perpendicular manner into the mixing chamber, while the low-viscosity constituent is injected in one stream and the total quantity of isocyanate in another stream in opposition to one another:

$$[(\tfrac{1}{3}m_{PolyH} \times p_{Poly}) + (\tfrac{2}{3}m_{PolyN} \times p_{Poly})] + [(m\text{Iso} \times p_{Iso})] = E$$

(1.33×10)+(2.66×150)+(6×150)

Energy of polyol 413+ energy of isocyanate 900=1313

Naturally, both the isocyanate and/or the low-viscosity polyol can also be injected in a plurality of sub-streams.

A mixing head with no stirring apparatus, comprising a mixing chamber with inlet openings for the components, is preferentially suited to the implementation of the new process.

The novelty is to be considered to consist in an inlet opening for the higher-viscosity polyol formulation and at least two inlet openings for low-viscosity components (isocyanate and optionally low-viscosity polyol), where the cross-sectional area of the inlet opening for the higher-viscosity polyol formulation is 10 to 100 times greater than the sum of the cross-sectional areas of the inlet openings for the low-viscosity component(s).

Such mixing heads are self-cleaning and in principle—depending upon their control facilities—permit continuous operation, for example for downstream belt systems, or also batchwise operation for the filling of moulding tools or other cavities to be filled.

The invention permits the production of reaction mixtures using polyol components with viscosities exceeding 3000 mPa.s, in particular of between 10,000 and 50,000 mPa.s.

A limitation of the viscosity of the polyol component is imposed by the required conveying means. Gear pumps, screw-spindle pumps or also worm conveyors are suitable conveying means at up to 100,000 mPa.s.

In the following the invention will be explained in detail making reference to the attached Figures.

The mixing head 1 according to the invention as shown in FIG. 1a contains a supply pipe 11 for the high-viscosity polyol and inlet openings 12 for the isocyanate. The inlet openings 12 have sealing cones 15 which are movable against prestressed springs and which open when isocyanate is supplied (arrow 14) at the required pressure. The mixing zone 13, which is not sharply defined in terms of geometry, is in the form of a simple flow-through pipe into which the injection nozzles 12 for the isocyanate open. The mixing zone 13 contains no turbulence-producing built-in members of any kind. The injection nozzles 12 for the isocyanate are preferably not oriented in the direction of the axis of the mixing zone 13 but rotated in the plane perpendicular to the axis in such manner that, as a result of the injection of the isocyanate, the high-viscosity polyol stream undergoes a rotary movement in the mixing zone 13 in order to assist the mixing. The outlet 2 of the mixing head 1 has the form of a slot die. FIG. 1b shows a section perpendicular to the drawing plane of FIG. 1a through the mixing head outlet 2.

FIG. 2 shows a mixing head 1 as in FIG. 1a, but with the outlet 2 in the form of a fan nozzle.

The mixing head 1 according to FIG. 3a is suitable for intermittent batchwise operation for the production of foam mouldings. The mixing head has a sealing piston 20 which is movable hydraulically in the axial direction (arrow 21). In order to fill the mould, the sealing piston 20 is moved back (as indicated by the arrow 21) so that the inlet 11 for the high-viscosity polyol and the injection nozzle 12 for the isocyanate are freed for entry into the mixing zone 13. From the mixing zone 13, the mixture passes into the outlet pipe 2, through which the mixture is introduced into the mould. When filling of the mould is complete, the sealing piston 20 is returned to the position shown, the inlets 11 and 12 to the mixing zone 13 being blocked. At the same time, the inlets 11 and 12 are connected via grooves 28 and 29 in the sealing piston 20 with the recirculation pipes 24 and 25 via which the high-viscosity polyol and the isocyanate are fed back into their respective storage containers. The recirculating stream is maintained during breaks between batches, as is customary in polyurethane production technology. The mixing head also has a hydraulically operated cleaning piston 26 which, at the end of a batch, once the sealing piston 20 has moved into the sealing position, ejects the mixture remaining in the outlet pipe 2 from the outlet pipe 2. FIG. 3b shows a section A—A through FIG. 3a. In the drawing shown by way of example three injection nozzles are provided for introducing the isocyanate. Variations in the construction of the mixing head are possible and can readily be deduced by the person skilled in the art from Becker/Braun, "Kunststoff-Handbuch", Vol. 7, Polyurethanes, p. 177–182 (1993). Essential to the invention is the large cross-section of the supply pipe for the high-viscosity polyol as compared with the isocyanate inlet openings, with correspondingly large cross-sections of the recirculation pipes, so that the high-viscosity polyol can be conveyed in a substantially pressure-free manner.

Figure 4C:
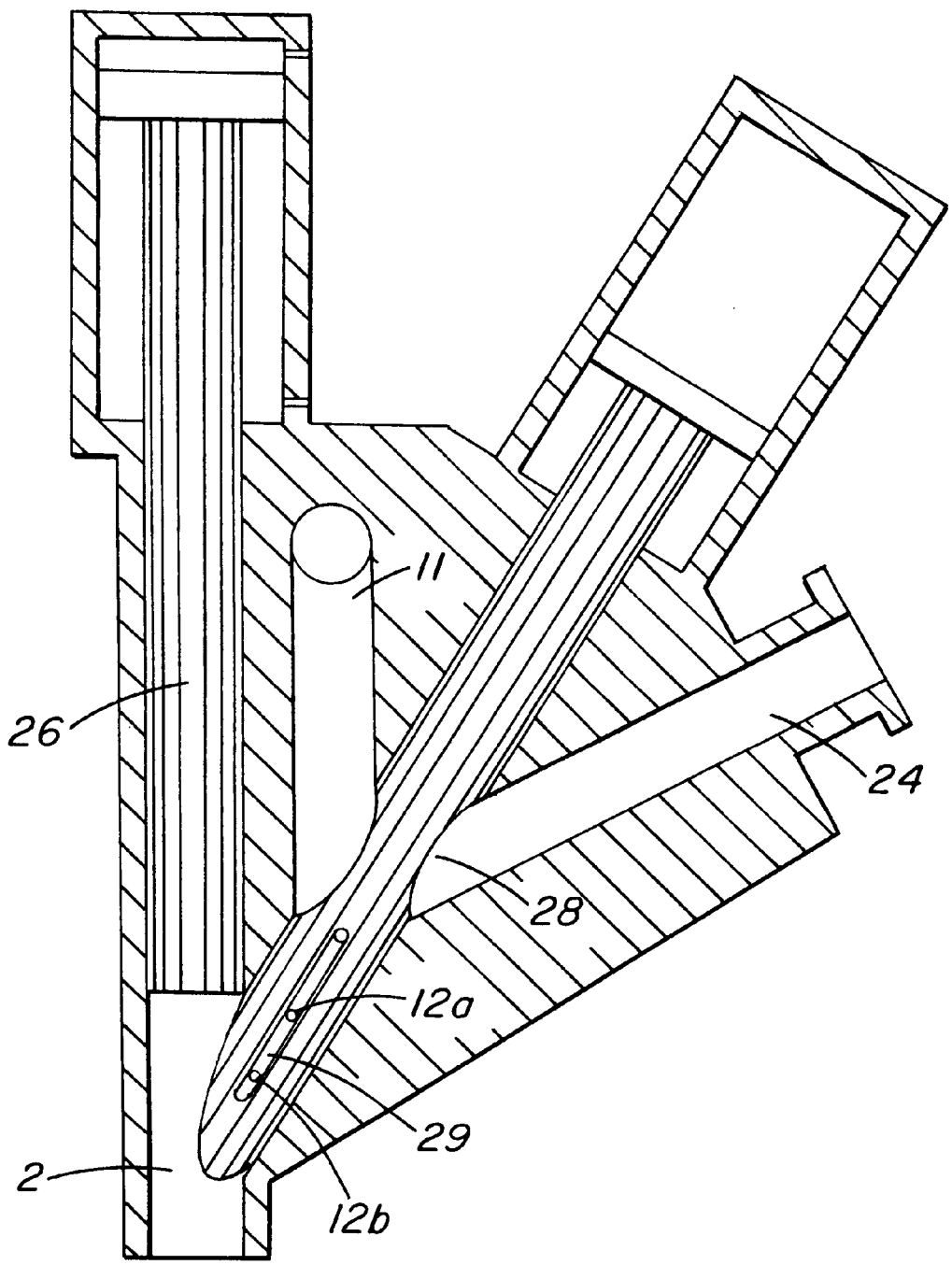

FIG. 4a shows an alternative embodiment of the mixing head according to the invention for intermittent batchwise operation, in which the turning angles for the high-viscosity polyol are kept small. The same reference symbols indicate the same elements as in FIG. 3a. FIG. 4b shows a section B—B through FIG. 4a. FIG. 4c shows a representation corresponding to FIG. 4a in which the sealing piston 20 has been moved into the sealing position. On introduction into the mixing zone 13, the high-viscosity polyol stream supplied via the supply pipe 11 is turned through only 20 to 35°. The introduction of the isocyanate (four inlet openings 12a and 12b arranged in pairs opposite one another) is effected perpendicular to the polyol stream. Here the isocyanate supply pipes 14a and 14b are offset in pairs in such manner that the polyol stream in the introduction planes is made to rotate in the opposite direction. Recirculation of the isocyanate at the end of a batch is effected via grooves 29 in the sealing piston 20. Recirculation of the high-viscosity polyol is effected by means of a bore 28 through the sealing piston 20, which bore produces the connection to the recirculation pipe 24 in the sealing position.

What is claimed is:

1. A process for producing a reaction mixture without a stirring apparatus comprising the steps of:
   a) feeding at least two low viscosity components and a high viscosity polyol to a mixing zone, wherein said high viscosity polyol has a viscosity of at least 3000 mPa.s;
   b) mixing said at least two low viscosity components and said high viscosity polyol in the mixing zone, wherein one of said at least two low viscosity components is an isocyanate; said high viscosity polyol is fed into the mixing zone at a low pressure and said at least two low viscosity components are injected at high pressure into the stream of said high viscosity polyol
wherein the cross-sectional area of said high viscosity polyol stream is 10 to 100 times greater than the sum of the cross-sectional areas of said at least two low viscosity components.

2. A process for producing a reaction mixture without a stirring apparatus comprising the steps of:
   a) feeding at least two low viscosity components and a high viscosity polyol to a mixing zone, wherein said high viscosity polyol has a viscosity of at least 3000 mPa.s;
   b) mixing said at least two low viscosity components and said high viscosity polyol in the mixing zone, wherein one of said at least two low viscosity components is an isocyanate; said high viscosity polyol is fed into the mixing zone at a low pressure and said at least two low viscosity components are injected at high pressure into the stream of said high viscosity polyol
wherein said streams of said at least two low viscosity components and said stream of said high viscosity polyol are introduced in the same plane of the mixing zone.

3. A mixing head having no stirring apparatus for producing a reaction mixture from at least two low-viscosity components and a higher-viscosity component, comprising a mixing chamber with inlet openings for the components, characterised by an inlet opening for the higher-viscosity component and at least two inlet openings for said at least two low-viscosity component streams, the cross-sectional area of the inlet opening for the high-viscosity component being 10 to 100 times greater than the sum of the cross-sectional areas of the inlet openings for said at least two low-viscosity components.

4. A mixing head according to claim 3, wherein the inlet openings for said at least two low-viscosity component(s) are uniformly distributed over the periphery of the mixing chamber and are arranged at least approximately perpendicular to the axis of the mixing chamber.

5. A mixing head according to claim 3, characterised in that all the inlet openings open into the mixing chamber in the same plane.

* * * * *